Oct. 27, 1936.  W. W. FLINCHUM  2,058,674
LAMINATED AND COMPOSITE PACKING
Filed May 2, 1934
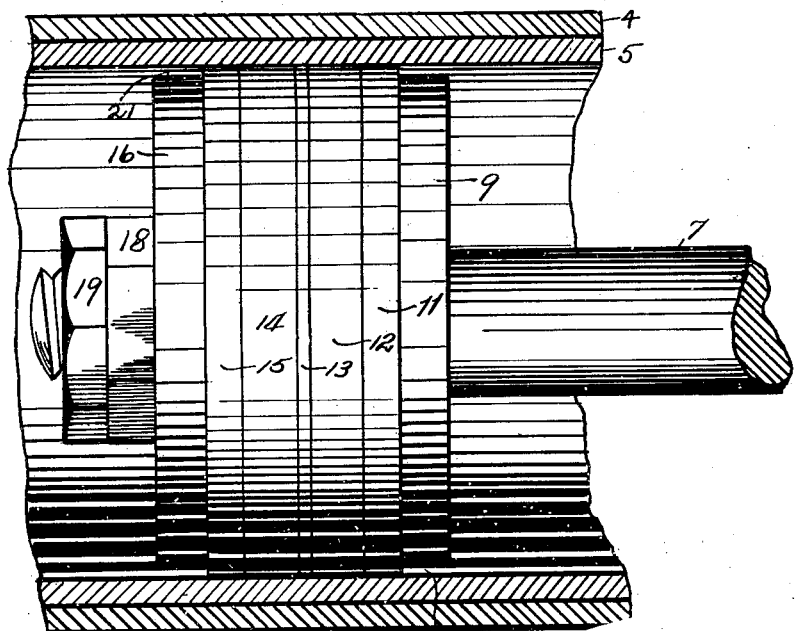
FIG 1
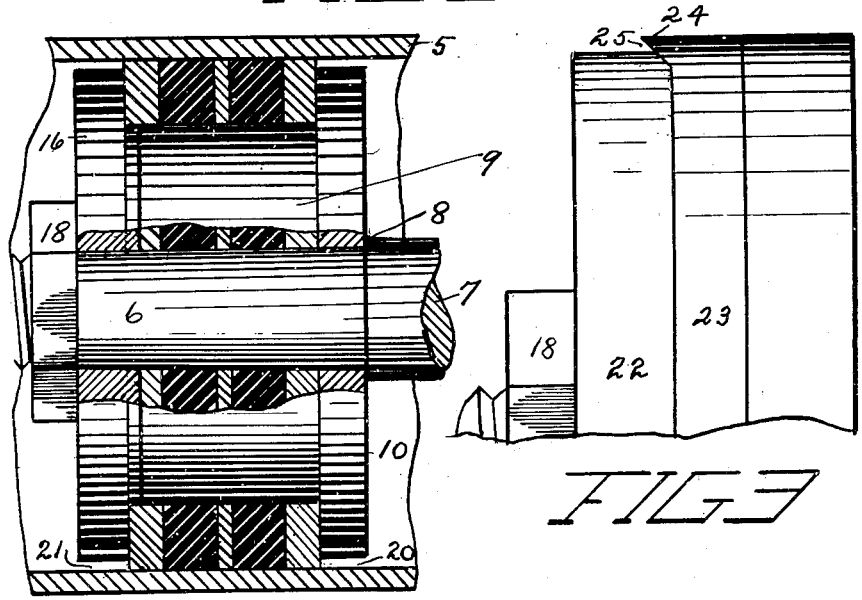
FIG 2
FIG 3
INVENTOR.
William Weldon Flinchum Patented Oct. 27, 1936

2,058,674

UNITED STATES PATENT OFFICE 2,058,674

LAMINATED AND COMPOSITE PACKING

William Weldon Flinchum, Oklahoma City, Okla.

Application May 2, 1934, Serial No. 723,533

1 Claim. (Cl. 309—23)

This invention relates to, and includes what is generally known as a piston or pump packing, or as a piston or pump rubber, or a swab rubber.

An object of the invention, among others which will appear, is to provide a laminated or composite structure, easy to assemble, and efficient in action.

Another object of the invention is to employ the pressure directed to either side of the packing for forcing the latter positively against the wall of a cylinder.

Referring to the drawing,

Figure 1 is a view showing the device in elevation, the packing on the end of the piston or pump rod, a portion of the cylinder and jacket being shown in cross-section.

Figure 2 is a more complete sectional view of the same structure, one of the jamb-nuts being removed.

Figure 3 is an enlarged detail view showing one side of a modified form of the invention, as it particularly relates to the pressure-receiving pockets.

Within a shell 4 is shown a cylinder 5 in which the composite and laminated packing or pump rubber is to be placed.

The end 6 of the piston rod 7, as seen, is tapered from the shoulder 8 to receive the units of the composite packing lamination, and the metal flanges between which the elements of the composite laminated packing are confined.

Referring to the packing structure, note the application of a drum 9 and its integral flange 10 to the taper 6 of the rod 7. On this drum and against the flange 10, is slipped a fabricated solid disc 11, consisting of rubber and fabric preferably. Next is applied a solid rubber disc 12. Then is applied a cushioning divider disc 13, after which again another solid rubber disc 14 is applied, prior to the application of another fabricated solid disc 15, similar to the first named fabricated disc. By reference to Figure 2 it is noted that the drum 9 is shorter than the length provided by the combined discs, and thus leaves a recess between the end of the drum 9 and the outer surface of the disc 15. Into this recess and against the drum-end enters a flange 16 which compresses the discs together, as the nut 18 is forced home preparatory to the application of the jamb nut 19.

It will be noted more particularly by reference to Figure 2 (where the shading is omitted for purpose of clarity) that the flanges 10 and 16 are of lesser diameter than the diameters of the discs forming the composite packing. This provides in Figures 1 and 2 pressure-receiving pockets 20 and 21, so that as the composite packing reciprocates in the cylinder, the pressure instead of only spreading over the outer sides of the flanges will be forced into the pockets 20 and 21 and thus be transmitted to and against the discs 11 and 15, and consequently to and through the body of the composite packing and assist in further forcing the packing peripheries out against the wall of the cylinder to produce an anti-leak packing.

By reference to the modification shown in Figure 3, which is a relative enlargement of discs 15 and 14 and flange 16, and which view is fragmentary, showing only one side, it will be noted that the periphery of the flange 22 is beveled inwardly toward the fabricated disc 23, which, in turn, has on its outer side a vulcanized rubber beak 24 and the wall of the beveled flange 22 and that of the beak 24 provides an angular pressure pocket 25 for receiving the pressure as the packing reciprocates, it being understood, of course, that this arrangement is provided on each side of the packing structure. If desired, the various discs of the composite unit may be vulcanized together, where the condition may so require.

While the invention has been set forth in detail the details constitute no part of the invention, but the invention resides in the provision of a composite packing of the nature set forth, together with the means provided for permitting the pressure to exert a radially distending influence upon the units, and prevent leaking.

It is also worthy of note that the pressure developed in pockets 21, 21, or 25 will minimize the collection of substances in the pockets, and thus protect the discs, especially 11, 15 and 24 from attack and destruction, thus prolonging the life of the packing as a unit, for if the aforesaid disc is thus protected, this protection will also be insured to the balance of the discs in the structure. Not alone that, but the hydraulic ram formed by the pressure in these pockets will prevent the edges of the packing discs from disintegrating and becoming fringy, or when, in practice, the edges of solid packings at the juncture of the same and the wall of the cylinder become frayed, they collect particles and hold them and allow them also to pass between the packing and the wall of the cylinder, and the packing soon becomes destroyed.

Having set forth the invention, I claim:

A packing-unit consisting of a drum having an integral and an appliable flange, each flange having one peripherial edge thereof beveled inwardly toward said drum, a pair of fabricated discs mounted on the drum and having one peripherial edge thereof bevelled complementary to the bevelled edge of the flanges and said edge overhanging said flanges, a vulcanized tip for each overhanging edge, a pair of flexible discs between the fabricated discs, a cushioning disc between the flexible discs, said discs and flanges being rectangular in cross-section, except the beaked fabricated disc aforementioned.

WILLIAM WELDON FLINCHUM.